(12) United States Patent
Capretta et al.

(10) Patent No.: US 8,175,202 B2
(45) Date of Patent: *May 8, 2012

(54) RECEIVER WITH CLOCK DRIFT COMPENSATION

(75) Inventors: Pietro Capretta, Brussels (BE); Steven Terryn, Lauwe (BE); Jean-Jacques Schmit, Limelette-Ottignies (BE)

(73) Assignee: ST-Ericsson SA, Plan-les-Ouates (CH)

( * ) Notice: Subject to any disclaimer, the term of this patent is extended or adjusted under 35 U.S.C. 154(b) by 1133 days.

This patent is subject to a terminal disclaimer.

(21) Appl. No.: 11/503,408

(22) Filed: Aug. 11, 2006

(65) Prior Publication Data

US 2007/0036252 A1    Feb. 15, 2007

(30) Foreign Application Priority Data

Aug. 12, 2005 (EP) .................................. 05447182

(51) Int. Cl.
*H04B 1/10* (2006.01)
(52) U.S. Cl. ........ 375/350; 375/355; 375/147; 375/341; 375/229; 370/338; 370/252; 370/332
(58) Field of Classification Search .................. 375/350, 375/355, 341, 229, 281, 147, 150, 343, 142; 370/332, 338, 252
See application file for complete search history.

(56) References Cited

U.S. PATENT DOCUMENTS

| | | | | |
|---|---|---|---|---|
| 5,513,209 A | | 4/1996 | Holm | |
| 5,579,345 A | | 11/1996 | Kroeger et al. | |
| 5,717,619 A | * | 2/1998 | Spurbeck et al. | 708/319 |
| 5,940,435 A | * | 8/1999 | Hendrickson | 375/147 |
| 5,946,359 A | | 8/1999 | Tajiri et al. | |
| 6,128,357 A | * | 10/2000 | Lu et al. | 375/355 |
| 6,275,545 B1 | * | 8/2001 | Suzuki | 375/343 |
| 6,470,056 B1 | | 10/2002 | Kurihara et al. | |
| 6,560,294 B1 | * | 5/2003 | Gatherer | 375/261 |

(Continued)

FOREIGN PATENT DOCUMENTS

EP    0 872 985 A1    10/1998

(Continued)

OTHER PUBLICATIONS

Communication from the EPO from corresponding European Patent Application No. 05447182.6, filed Aug. 12, 2005.

(Continued)

*Primary Examiner* — Eva Puente
(74) *Attorney, Agent, or Firm* — Wolf, Greenfield & Sacks, P.C.

(57) ABSTRACT

A receiver is described including circuitry for deriving at least a first stream of first digitized samples from a received analog signal at a first sampling rate, circuitry for selecting a first sampling point and at least a second sampling point, a demodulator for demodulating first and second symbols from the at least first stream of samples based on the first and the at least second sampling points, and circuitry for determining a value related to a demodulation accuracy for the first and second symbols and for outputting a signal, the circuitry for selecting being adapted to alter the sampling point based on the signal. By assessing a demodulation accuracy in real time clock drift can be compensated. The demodulation accuracy can be a value related to a phase error or an error energy such as EVM or DEVM for each demodulated symbol.

24 Claims, 10 Drawing Sheets

U.S. PATENT DOCUMENTS

| | | | |
|---|---|---|---|
| 6,898,198 B1* | 5/2005 | Ryan et al. | 370/338 |
| 6,904,084 B2* | 6/2005 | Huang et al. | 375/229 |
| 7,035,029 B2* | 4/2006 | Sawada et al. | 360/51 |
| 7,403,556 B2* | 7/2008 | Kao et al. | 375/147 |
| 2003/0185173 A1* | 10/2003 | Min | 370/332 |
| 2006/0256896 A1* | 11/2006 | Venkataramani et al. | 375/341 |

FOREIGN PATENT DOCUMENTS

| | | |
|---|---|---|
| EP | 0 892 528 A2 | 1/1999 |

OTHER PUBLICATIONS

*Polyphase Filterbanks for Symbol Timing Synchronization in Sampled Data Receivers*, Rice, M., et.al., Dept. of Electr. & Comput. Eng., Brigham Young Univ., Provo, UT, USA; paper appears in: *MILCOM 2002. Proceedings*, Publication Date: Oct. 7-10, 2002, vol. 2, on pp. 982-986 vol. 2, ISSN:ISBN: 0-7803-7625-0, INSPEC Accession No. 7749071, Posted online: Feb. 23, 2003 IEEE 2002.

European Search Report from European Patent Application 05447182, filed Aug. 12, 2005.

European Search Report from European Patent Application 05447185, filed Aug. 12, 2005.

European Search Report from European Patent Application 05447183, filed Aug. 12, 2005.

European Search Report from European Patent Application 05447184, filed Aug. 12, 2005.

Rice, M. et al. "Polyphase filterbanks for symbol timing synchronization in sampled data receivers" Military Communications Conference. MILCOM 2002. Proceedings. Anaheim, CA, Oct. 7-10, 2002, IEEE Military Communications Conference, New York, NY: IEEE, US, vol. vol. 1 of 2, Oct. 7, 2002, pp. 982-986, XP010631909 ISBN: 0-7803-7625-0.

Min J. et al. "Synchronization techniques for a frequency-hopped wireless transceiver" Vehicular technology for the Human Race., IEEE 46$^{th}$ Atlanta, GA, USA Apr. 28-May 1, 1996, New York, NY, USA, IEEE, US vol. 1, Apr. 28, 1996, pp. 183-187, XP010162373 ISBN: 0-7803-3157-5.

Henker M., et al. "Time-variant CIC-filters for sample rate conversion with arbitrary rational factors" Electronics, Circuits and Systems, 1999. Proceedings of ICECS '99. The 6$^{th}$ IEEE International Conference on Pafos, Cyprus, Sep. 5-8, 1999, Picsataway, NJ, USA, IEEE, US, vol. 1, Sep. 5, 1999, pp. 67-70, XP010361448 ISBN: 0-7803-5682-9.

Gardner F. M. "Interpolation in Digital Modems. \Part I: Fundamentals" IEEE Transactions on Communications, IEEE Service Center, Piscataway, NJ, US, vol. 41, No. 3, Mar. 1, 1993, pp. 501-507, XP000372693, ISSN: 0090-6778.

* cited by examiner

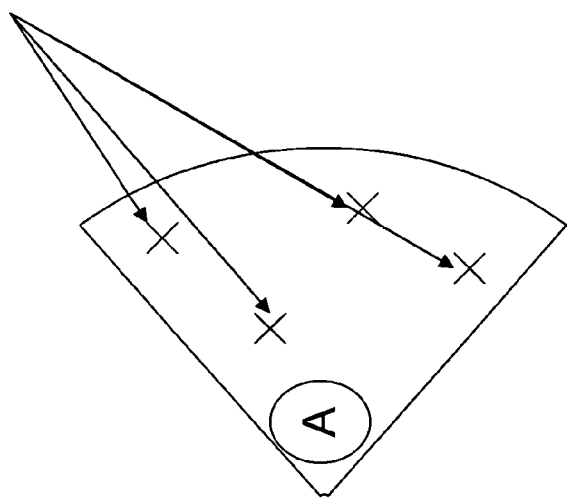
Fig. 6b
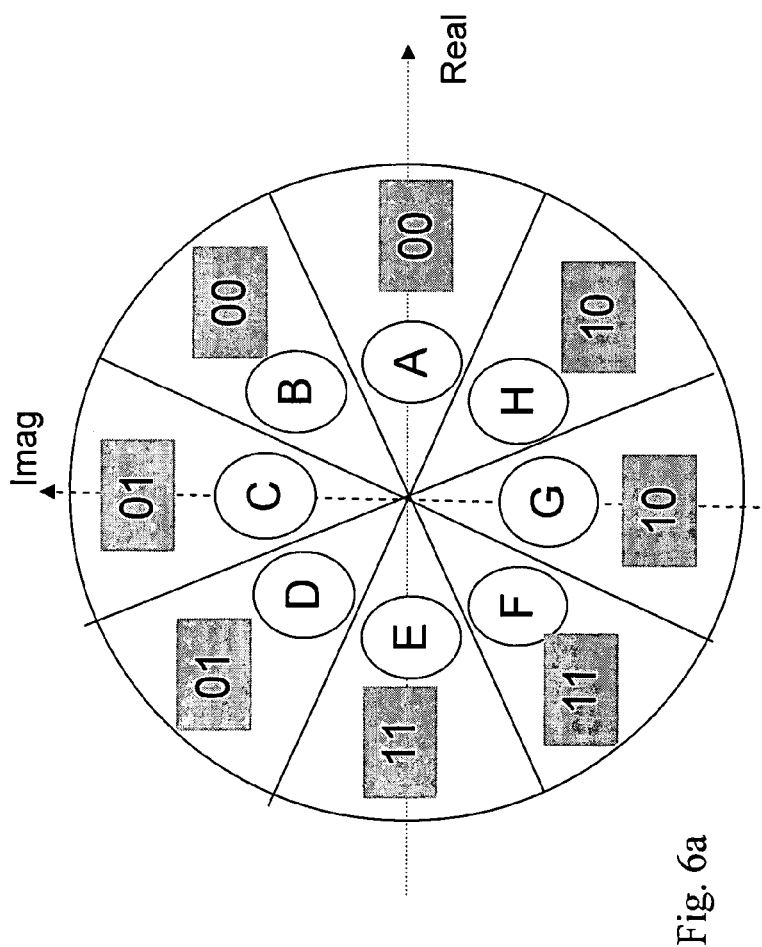
Fig. 6a
Fig. 6

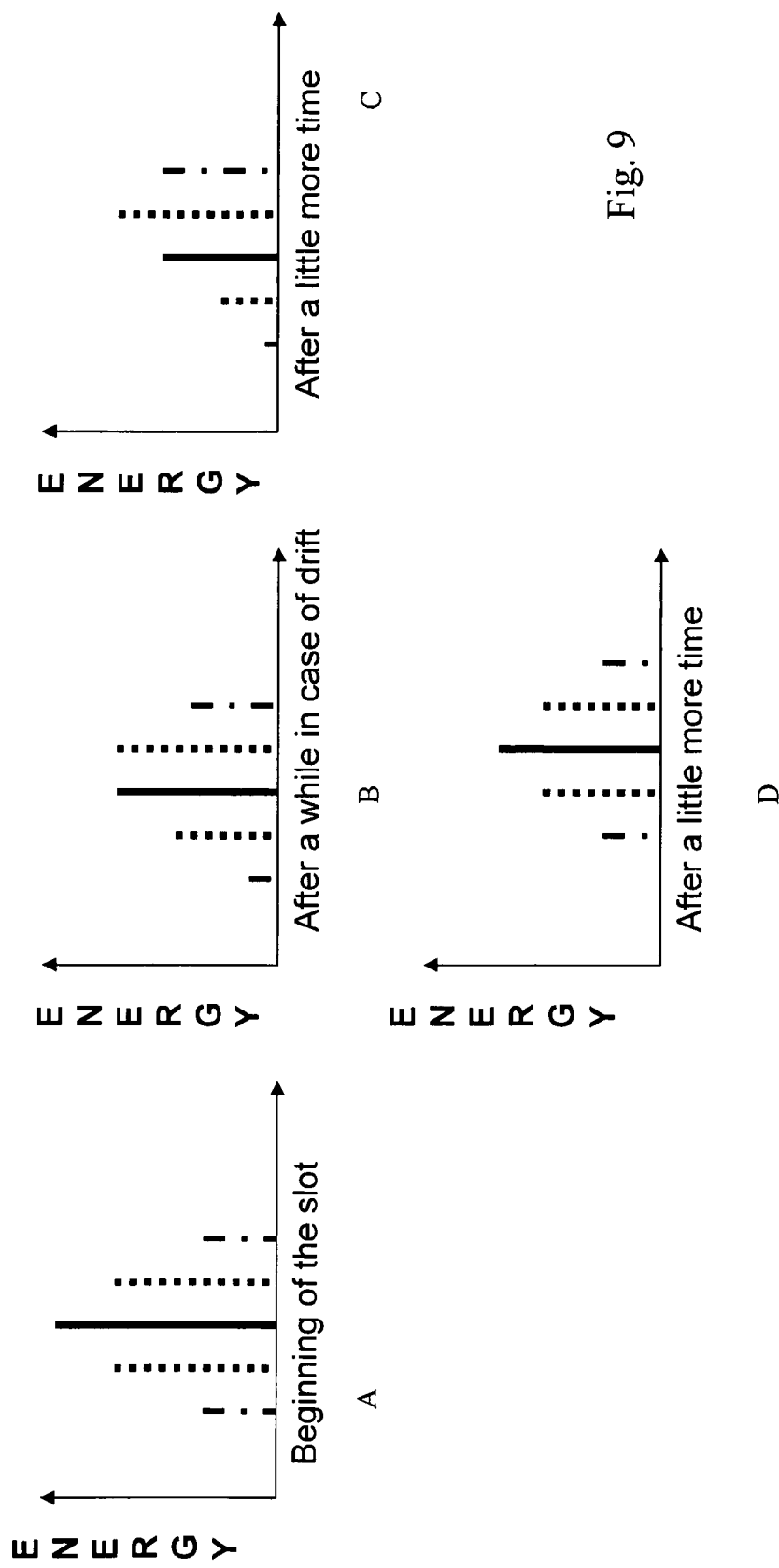

RECEIVER WITH CLOCK DRIFT COMPENSATION

BACKGROUND OF THE INVENTION

1. Field of the Invention

The present invention relates to telecommunication systems especially wireless systems, wireless transmitters and wireless receivers, especially those using the Bluetooth standard. The present invention also relates to semiconductor integrated circuits that implement a wireless receiver and/or a wireless transmitter especially those using the Bluetooth standard, as well as software for implementing the transmitter and/or receiver.

2. Technical Background

The Bluetooth wireless interface, introduced by the Bluetooth Special Interest Group (Ericsson, Nokia, IBM, Toshiba and Intel) in 1998, is designed to be a low-cost, low-power and short-range cable replacement.

Version 2.0+EDR of the Bluetooth standards introduces an Enhanced Data Rate (EDR) operation. The EDR standard is an improvement over the Basic Rate standard. New modulation schemes: $\pi/4$-DQPSK and 8DPSK, are proposed as well as the conventional GFSK. The bandwidth of the channel is 1 MHz.

The unit establishing a connection is called a master. The master unit uses a free-running clock to periodically transmit in every second slot and poll/select one of the slaves in a piconet by implicitly assigning the next slot for the transmission. There are two types of links:

- synchronous connection oriented (SCO)
- asynchronous connection-less (ACL)

One of the distortion problems that needs to be compensated in a system using Bluetooth EDR is the system clock drift. Normally there can be a maximum clock drift of 40 ppm between two devices. The effect of clock drift is that gradually the best sampling point drifts away from the one selected during correlation in the receiver. This can result in some bit errors at the end of the packet for long packets in 3 Mbps EDR (3-DH5 packets).

SUMMARY OF THE INVENTION

It is an object of the present invention to provide a receiver for a wireless telecommunications device which has compensation for clock drift. An advantage of the present invention is that a wireless receiver is provided such as a Bluetooth receiver that can be implemented with a low power consumption. A further advantage is that the receiver can be an Enhanced Data Rate receiver able to use the most performant modulation, e.g. an M-state phase modulation with M equal to 2 or more.

In one aspect the present invention provides a receive path in a receiver comprising: means for deriving at least a first stream of first digitized samples from a received analog signal at a first sampling rate, means for selecting a first sampling point and at least a second sampling point, a demodulator for demodulating first and second symbols from the at least first stream of samples based on the first and the at least second sampling points, and means for determining a value related to a demodulation accuracy for the first and second symbols and for outputting a signal, the means for selecting being adapted to alter the sampling point based on the signal. The samples on either side of the current best sampling point may be samples obtained by oversampling the received analog signal. A further advantage is that clock offset can be corrected at other times than when receiving known sequences. By assessing a demodulation accuracy in real time, a clock drift can be compensated for in real time. The term sampling point does not relate to an ADC sampling point but the sampling point required after the digital elaboration performed after the ADC, i.e. the sampling point of the samples selected from the sampling after the digital elaboration.

The demodulation accuracy can be a value related to a phase error in demodulated signals or to an error energy related to a demodulated signals such as EVM or DEVM for each demodulated symbol. The advantage of using EVM or DEVM is that it is a standard metric for assessing demodulation accuracy.

At least one interpolating filter can be placed in parallel with the first stream of first digitized samples for generating at least a second stream of digitized samples at the first sampling rate but offset with respect to the first stream by a fraction of a sample time period. This provides the advantage that a higher sample granularity can be obtained without increasing the sample rate.

The first and the at least one second streams can be fed to the means for selecting a first sampling point and at least a second sampling point, the demodulator being adapted to demodulate first and second symbols from the first stream and/or from the at least one second stream of samples based on the first and the at least second sampling points. By using first and second streams offset from each other, symbols can be demodulated which are very close to each other to allow a fine and therefore rapid determination of a change caused by clock drift.

A multiplexer to select samples from the first or at least one second streams and to feed these to the demodulator. The means for selecting a first sampling point and at least a second sampling point can be a correlator. Both of these are well known circuit elements.

The demodulator is preferably an M-ary demodulator, e.g. an M-state phase modulator with M equal to 2 or more, especially a differential phase modulator. The receiver can be a Bluetooth receiver operating in Enhanced Data Rate mode. The invention allows a better bit error rate when using M-ary systems.

The means for deriving a first stream of first digitized samples from a received analog signal at a first sampling rate can comprise: means for generating a third stream of digitized samples from the received analog signal at a second sampling rate and a further interpolating filter receiving the third stream from the means for generating the third stream, to generate the stream of first digitized samples which are estimates of samples obtainable by sampling the received analog signal at the first sample rate lower than the second sampling rate, the first digitized samples being output at the first sampling rate and including at least one unusable sample. This avoids the need for an additional oscillator.

A circuit for generating a signal for controlling components of the receive path downstream of the further interpolation filter can be provided to prevent processing of the unusable second digitized samples. Such a circuit can be a counter which is easy to implement.

An SRRC filter can be provided for receiving the first digitized samples, the SRRC filter being configured to process samples at the first sample rate. By using matched SRRC filters in both the transmit and receive paths ISI can be reduced or eliminated.

The present invention provides a method of operating a receiver comprising: deriving at least a first stream of first digitized samples from a received analog signal at a first sampling rate, selecting a first sampling point and at least a second sampling point, demodulating first and second symbols from the at least first stream of samples based on the first and the at least second sampling points, determining a value relating to a demodulation accuracy for the first and second symbols, and altering the sampling point based on the result of the determination. The value related to the demodulation accuracy can be a value related to a phase error of demodulated signals or to an energy related to demodulation accuracy such such as EVM or DEVM for each demodulated symbol.

The method may include a step of downconverting a received wireless signal into a lower frequency analog signal, the downconverting step being followed by a digitization step on said lower frequency analog signal such as to obtain the in-phase component and the orthogonal phase component of the digital baseband signal.

Alternatively, digitization can include an analog/digital conversion followed by a digital downconversion such as to obtain said in-phase component and said orthogonal phase component. The digitization step may include oversampling.

An optional vector product step may also be applied.

The present invention includes software products for implementing any of the methods or devices according to the present invention in software for execution on a processing engine such as a microprocessor or an FPGA. The software may be supplied stored on a suitable machine readable signal medium such as an optical disk, e.g. CD-ROM or DVD-ROM, or disk or diskette, solid state memory, magnetic tape etc.

BRIEF DESCRIPTION OF THE DRAWINGS

FIG. 6a shows the diagram of FIG. 5 and FIG. 6b shows the locations of symbols demodulated with sampling points on either side of the current best sampling point in accordance with an embodiment of the present invention in one of the decision areas.

FIG. 9 shows how the energy of the symbol based on the current best sampling time drifts because of clock drift (FIGS. 9a-c) and is corrected in accordance with an embodiment of the present invention—FIG. 9d.

DETAILED DESCRIPTION

The present invention will be described with reference to certain drawings and to certain embodiments but this description is by way of example only. The present application relates to telecommunication devices especially wireless communication devices using M-ary modulation, e.g. M-state phase modulation with M equal to 2 or greater than 2, especially differential phase keyed demodulators. Specific examples will be described with reference to 8-DPSK, but the present invention can be applied to any modulation scheme using a plurality of constellation points.

Figure 1:
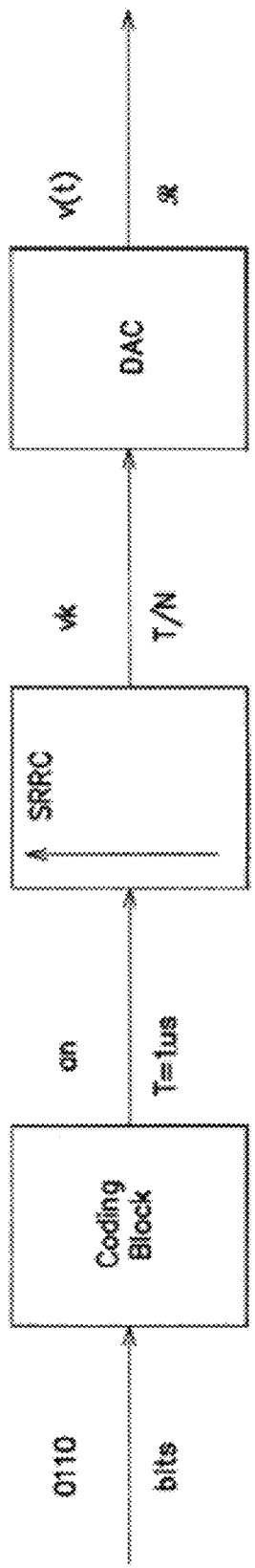
FIG. 1 is a schematic representation of a transmitter which may be used with a receiver according to the present invention.

A Bluetooth transmitter is shown schematically in FIG. 1. The bits for transmission arrive at 1 Mbps, 2 Mbps or 3 Mbps and are coded in symbols "an" at 1Msymbol per second. So the symbol time period "T" is 1 µs. The symbols are shaped with a filter such as an SRRC filter and the modulated signal at digital level can be produced using any whole multiple of 1 MHz. For example, 13 MHz can be used as this is an available clock in a Bluetooth system. Finally a Digital to analog converter (DAC) is used to produce the analog modulated signal to be sent to the analog part of the transmitter.

A Bluetooth receiver has an analog front end and a digital part separated by a digitizing device, e.g. an analog to digital converter (ADC). At the ADC in a Bluetooth receiver there are two simple possibilities for the sampling frequency: 13 MHz or 6.5 MHz. When operating at a sampling frequency of 6.5 MHz, theoretically the SRRC-receive filters (SRRC-Rx) could be matched to the SRRC-transmit filter (SRRC-Tx). The sampling frequency for the receiver has to be an integer multiple of the output frequency value of 1 MHz. One way is sampling at 13 MHz. This increases the complexity of the demodulator block, increases power consumption and cost. Another way of doing this is to provide an additional oscillator to generate a whole multiple frequency of 1 MHz lower than 13 MHz, e.g. 8 MHz, to clock the ADC and the other components of the digital part. Although sampling frequencies at lower frequencies such as 8 MHz can reduce the cost and complexity of the digital part of the receiver chain, it also reduces the accuracy of sample extraction as the number of samples per symbol is low.

A basic receiver such as a Bluetooth receiver or transceiver will be described with reference to FIGS. 2A and 2B. When implemented in a transceiver a transmit path is also provided which, however, will not be described. FIG. 3 is a detailed view of part of a receiver path such as shown in FIGS. 2A and 2B.

Figures 2A, 2B:
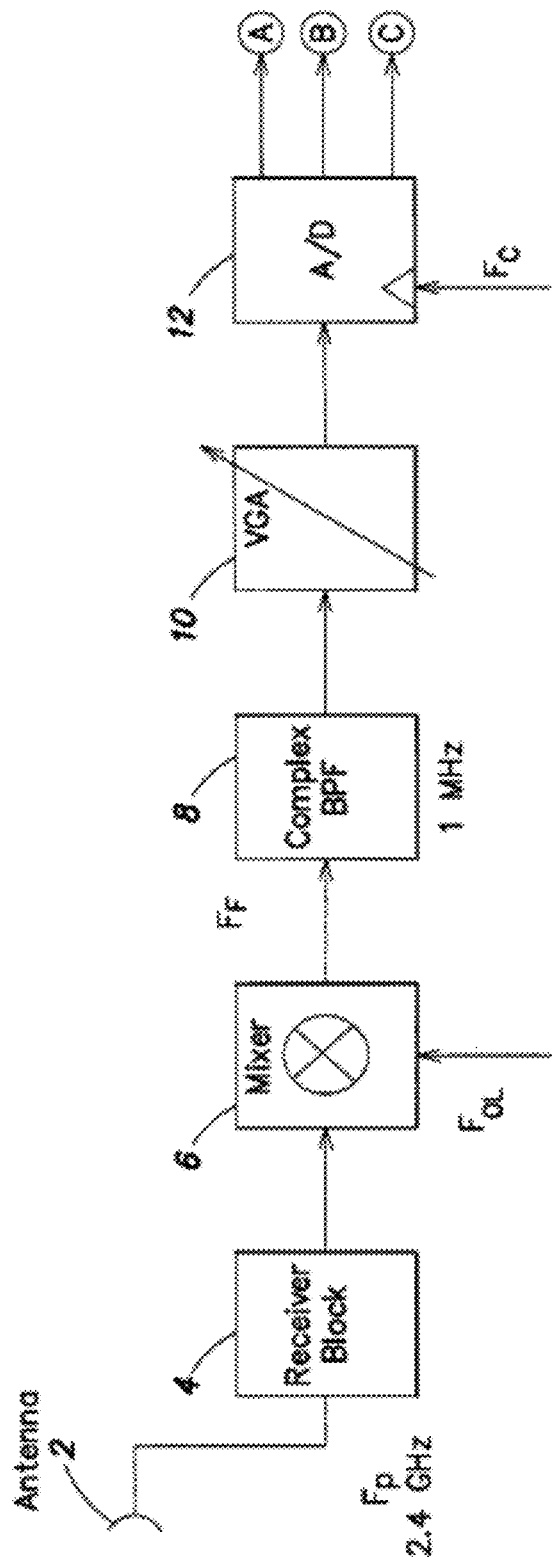
FIGS. 2A and 2B are a schematic representation of a receiver with which the present invention can be used.
Figure 2B:
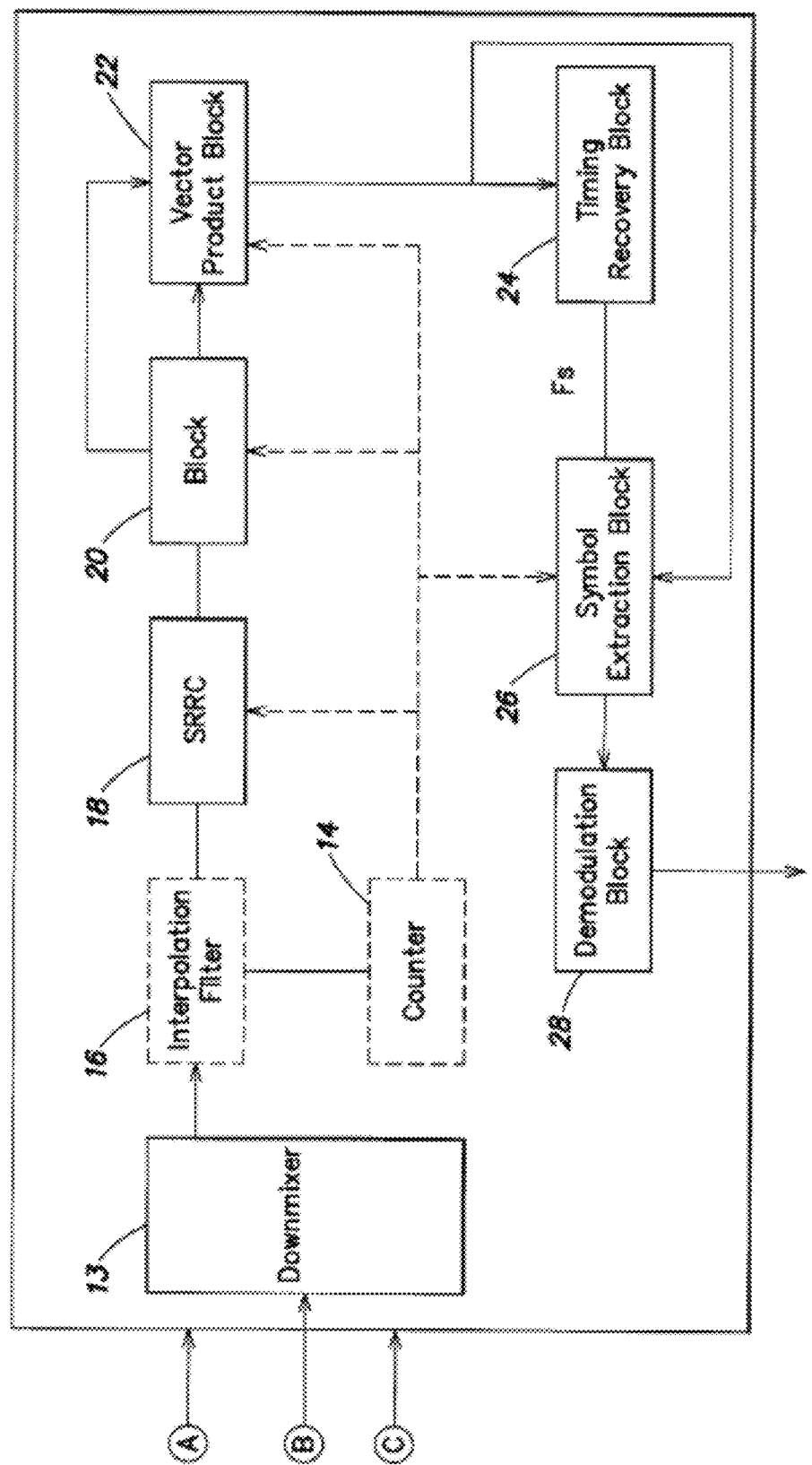
Figure 3:
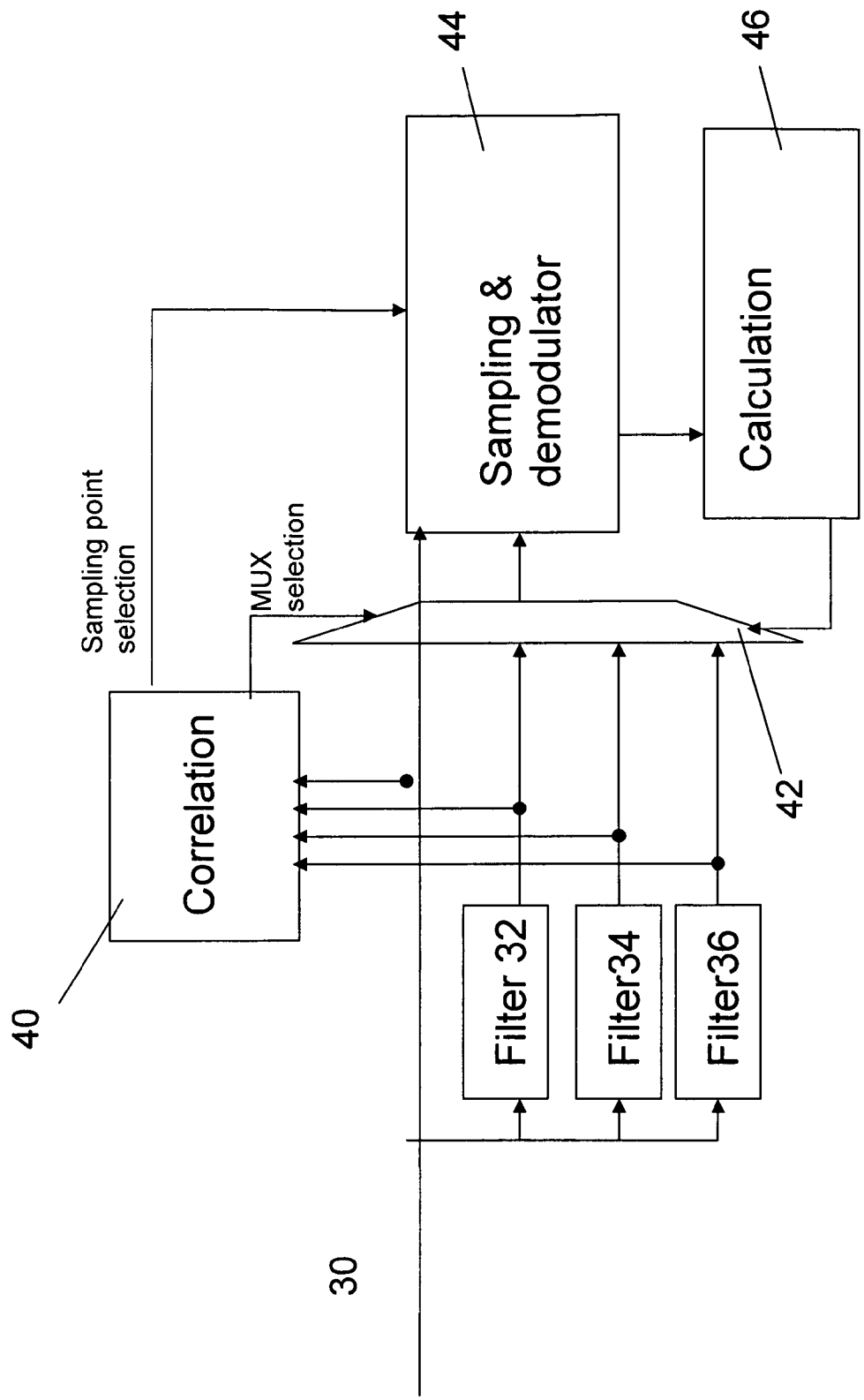
FIG. 3 is a detail of the receiver of FIGS. 2A and 2B showing an embodiment of the present invention.
Figure 4A:
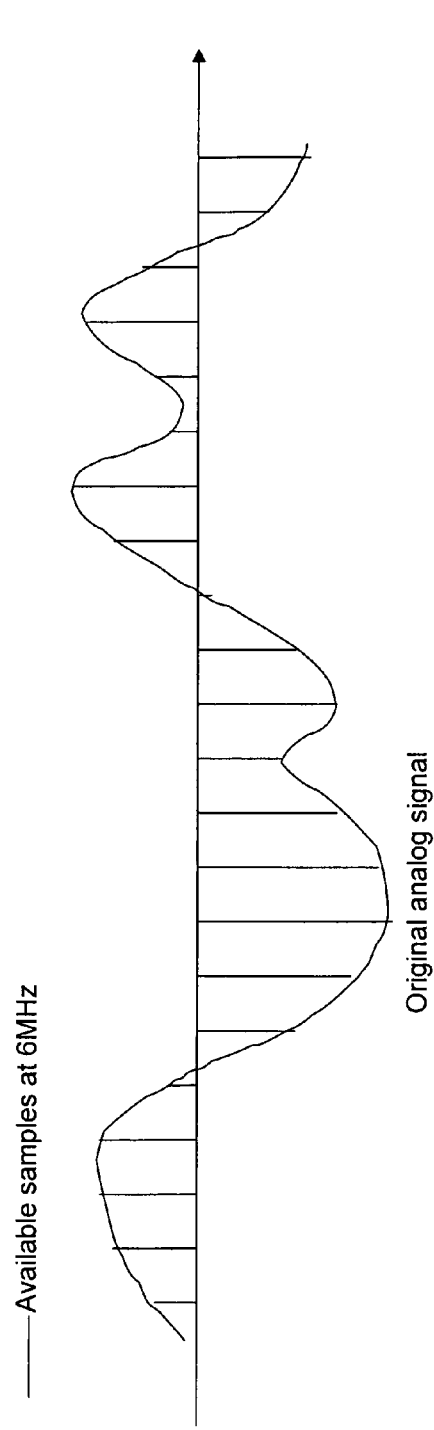
FIG. 4a shows a basic sample stream at 6 MHz and 4b shows the effect on the sample stream of use of parallel interpolating filters before demodulation in accordance with an embodiment of the present invention.
Figure 4B:
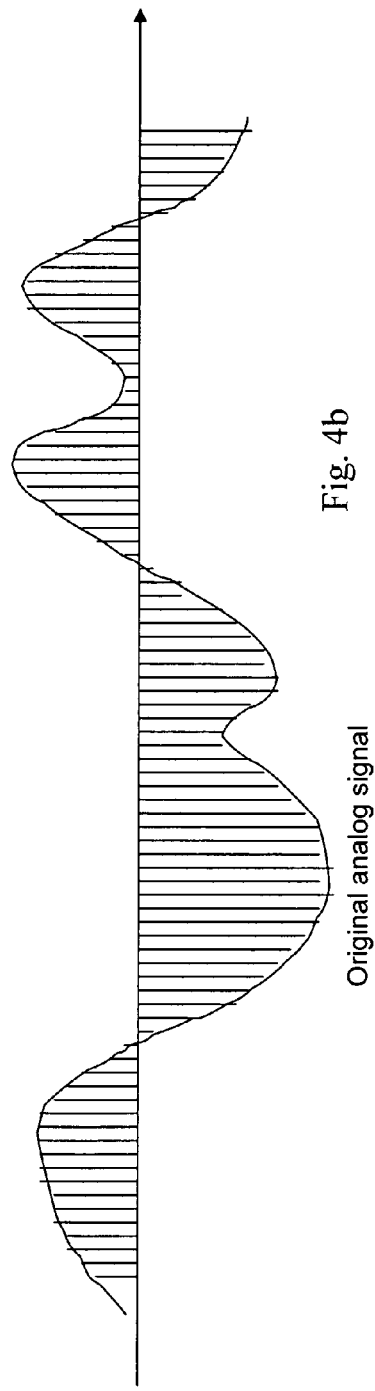

The analog radio front end and the digital part separated by an analog to digital converter (ADC) as shown in FIGS. 2A and 2B are examples only and are not limiting of the present invention. In the radio front-end the RF filters, oscillators, and image-reject mixers process input signals at high frequencies. To keep costs down, the input signal can be shifted to a lower intermediate frequency which allows on-chip construction of low power filters. The RF transmitted signal centered on 2.4 GHz is received at an antenna 2 and filtered by the Reception band-pass filter 4. An analog Down-Mixer 6 and a Complex band pass filter 8 can then be used to obtain the bandpass signal, which occupies a 1 MHz-band centered on the intermediate frequency. Although not shown, the local oscillator frequency ($F_{OL}$) value of the down-mixer can be modified by feedback control from a timing recovery block in the digital part (see later). A Voltage Gain Adaptation (VGA) block 10 can be used in order to adapt the signal amplitude to the input dynamic range of the other blocks in the device. In particular it is useful to control the amplitude so as not to overrange the A/D converter (ADC) 12. The signal is sampled with a sampling frequency $F_c$, for example equal to a whole number multiple of 1 MHz, e.g. 8 MHz or 13 MHz, and the signal is digitized using an A/D converter 12. Although the sampling frequency for both the DAC in the transmitter and the receive ADC 12 needs to be a whole multiple of 1 MHz if SRRC filters are to be used and the advantage of reduction of ISI obtained, it is not necessary that the integer value be the same for both transmit and receive paths.

In the following some possible components downstream of the ADC 12 in FIGS. 2A and 2B are described. These are not limiting of the invention. As an example of possible downstream blocks (if the downmixer in the analog front end was not down to baseband) the digitized signal from the ADC 12 can be processed optionally through a downmixer 13 in which the signals from the ADC 12 are combined with signals from a low frequency, e.g. baseband frequency oscillator, e.g. a numerically controlled oscillator. The numerically controlled oscillator may receive a frequency offset signal from the digital elaboration part of the receiver (not shown) to compensate for carrier frequency offset, see for example U.S. Pat. No. 6,703,896. The signals may then be filtered e.g. by an SRRC filter 18. An SRRC is a filter which approaches a Nyquist filter, i.e. one which has a perfect (vertical) cut-off. In fact an SRRC filter does not have a perfect cut-off but has a roll-off which means that the filtered output requires more bandwidth than a perfect Nyquist filter. The complex digitized input signal supplied to the SRRC is split into the two real components: the in-phase and the in-quadrature digitized signals. At this point, each component is filtered by the SRRC filter 18. A FIR filter structure can be chosen for the implementation of the SRRC 18. The FIR filter is provided with coefficients (taps) to thereby perform SRRC filtering for both the complex signal components. The shaped samples from the SRRC 18 are supplied to a Vector Product block 22. This block combines two digitized complex symbols one delayed with respect to the other. For example, one can be delayed by one sample period in block 20. Reference is made to U.S. Pat. No. 6,703,896 for further details which is incorporated herein by reference. The output of the vector product block 22 is used to obtain the symbol timing in block 24. A Symbol-Extraction block 26 selects one digitized symbol every T period in the position specified by the timing recovery block 24. This symbol is chosen among the samples belonging to the digitized signal. The point in the samples which is chosen to obtain the symbol will be called the "sampling point" in the following.

In an alternative embodiment of the present invention a fractional frequency such as 6.5 MHz can be used as explained below to clock the ADC 12 and other components downstream of the ADC. For the transmit side a value of 13 MHz can be used to clock the DAC. However on the receive side it is preferred to use a low value such as 6.5 MHz as the sampling frequency for the ADC 12 and for components of the digital receive path downstream of the ADC 12. This reduces the cost of the ADC and downstream components in the receiver chain. If the received analog signals are digitized in the ADC 12 at a first sampling rate of 6.5 MHz to generate first digitized samples, this is a non-whole integer of 1 MHz. This problem can be solved in this alternative embodiment by inserting an interpolation filter 16 prior to the SRRC filter 18. The additional components of this embodiment are shown as dashed lines in FIG. 2B. The interpolation filter 16 runs at 6.5 MHz and estimates from the first digitized samples obtained at the sample rate of 6.5 MHz received from the ADC 12, second samples which would have been obtained if the sampling frequency of the received analog signal in the ADC 12 would have been a whole integer multiple of 1 MHz, e.g. 6 MHz. The interpolation filter 16 may be implemented in any suitable way, e.g. as a FIR filter. The taps of the FIR filter are altered at each sample to interpolate the next sample to be used.

For example, the output of the filter 16 can be represented as the following sequence:
ABCDEFGHILMNXOPQRSTUVZABCXDEFG . . .
If a real 6 MHz sampling had been carried out the sequence would be:
ABCDEFGHILMNOPQRSTUVZABCDEFG . . .
The output of filter 16 is an estimation of the samples which would have been obtained from the received analog signal if it would have been sampled at 6 MHz with the addition of one unused sample every 13 samples which is indicated with X in the sequences above. In accordance with this embodiment the 13 samples obtained from the ADC 12 are interpolated to 12 values which are an estimate of the samples which would have been obtained if the sampling of the received analog signal would have been performed at 6 MHz and with the addition of one sample—the $13^{th}$. This $13^{th}$ sample would not have been included in samples at 6 MHz and is not used in subsequent processes. In order to record the 13th sample, a counter means 14 is provided. This counter means 14 transmits a suitable signal at each $13^{th}$ symbol to downstream components in order to control the operation of these devices, e.g. deactivate these components or otherwise ensure that the $13^{th}$ bits are not used. The counter means 14 can be implemented in any suitable way known for counters. Although in the above 6 MHz has been chosen, other integer values could be taken, e.g. 5 MHz however 6 MHz is preferred as it is closest to 6.5 MHz and the minimum number of samples are unused, i.e. 1.

The first downstream component affected by the use of filter 16 is the SRRC 18. A FIR filter structure can be chosen for the implementation of the SRRC 18. The FIR filter is provided with coefficients (taps) to thereby perform SRRC filtering for both the complex signal components. It operates at a clock frequency of 6.5 MHz but has coefficients (taps) for processing samples at 6 MHz, i.e. the taps of the SRRC filter are configured to process symbols sampled at 6 MHz while the device is being operated at 6.5 MHz. The SRRC receives from filter 16 samples which are the same as those which would have been obtained at a sampling frequency of 6 MHz with the addition of an unused (unreliable) $13^{th}$ sample. This means that every $13^{th}$ sample received by the SRRC 18 must be ignored. This is achieved by the signal for the $13^{th}$ sample from the counting means 14 being received at the SRRC filter 18 and that the SRRC 18 is adapted so that on receipt of this blocking signal it does not process this $13^{th}$ sample. The $13^{th}$ sample will have some indeterminate value and is not reliable. Hence it cannot be used in other downstream modules. The SRRC filter 18, the ADC 12, and the interpolating filter 16 can all be clocked at the same frequency, e.g. 6.5 Mhz, or a multiple thereof.

In the following some further optional downstream components are described. These are not limiting of the invention. As an example of possible downstream blocks the signal can be processed through a Vector Product block 22. This block combines two digitized complex symbols as explained above. The output of the vector product block 22 is used to obtain the symbol timing in block 24. A Symbol-Extraction block 26 selects one digitized symbol every T period in the position specified by the timing recovery block 24. This symbol is chosen among the 12 samples belonging to the digitized signal whereby the $13^{th}$ sample is always ignored.

Finally, demodulation, e.g. using an M-ary demodulator, especially an M-state phase modulator with M equal to or greater than 2, especially a phase shift keyed demodulator such as an 8-DPSK demodulator, is carried out in demodulation block 28 for any of the receiver architectures described above. For 8-DPSK modulation, this block 28 evaluates the phase difference of the selected sample. It recognizes in which region of the constellation points the received signal samples are located. For 8-DPSK eight constellation regions are checked.

FIG. 3 shows an embodiment of the present invention which is a specific implementation of the Symbol-Extraction block 26 and the demodulator block 28 of FIG. 2B. In a first aspect of this embodiment of the present invention the problem is addressed that the number of samples arriving at the Symbol-Extraction block 26 is low, e.g. at a rate of 6 or 8 MHz. As shown in FIG. 3 this stream of samples is given the reference number 30. In parallel with the stream 30 at least one additional interpolating filter 32, 34, 36 is provided. Interpolating filters are known to the skilled person and can be implemented in various ways, e.g. polyphase filters, FIR filters. The one or each interpolating filter 32, 34, 36 provides at its output samples at the same rate as the stream 30, e.g. 6 or 8 MHz but each set of samples is offset with respect to the sample stream 30. For example, if the sample stream 30 is running at 6 Mhz and there are three filters in parallel, then the sample stream output from the first filter 32 is offset with respect to the sample stream 30 by one quarter of a sample period. The output of the second interpolating filter 34 is offset one quarter of a sample period with respect to the output from filter 32 and the output of the third interpolating filter 36 is offset by one quarter of a sample period compared to the output of filter 34. For example, each of these filters 32, 34, 36 can be a FIR filter needing only 10 taps. The input to the Symbol-Extraction block 26 is therefore equivalent to 4.times.6 MHz or a sample stream at 24 MHz. This provides an additional accuracy in selecting the sample for each symbol while requiring only extra filters of low complexity and small size. Hence the electronic circuitry making up the digital part of the receiver is run at a low frequency such as 6.5 MHz or 8 MHz which means the components in the digital receiving path are small in size, e.g. the filters, but a better sample granularity is rebuild before the symbol extracting block 26. For example it is possible to achieve a receive sample granularity of 24 MHz in a system that requires a maximum clock frequency of 13 MHz, e.g. for the transmitter. This means that the power consumption can be kept low. With the one or more, e.g. three interpolation filters 32, 34, 36 an improved sample granularity, e.g. samples at 24 MHz are obtained although the ADC 12 runs at 6.5 MHz.

Referring again to FIG. 3, in a further independent aspect of this embodiment of the present invention, the problem is addressed of how to follow the best sampling point evolution due to the clock drift. This problem is important after synchronization sequences in the slot have passed. While such sequences are being processed, e.g. when known sequences can be correlated, either by cross-correlation or autocorrelation or a combination of the two, then conventionally a timing can be extracted. At other times this is more difficult. The solution to this problem in accordance with this embodiment is to determine a value related to a parameter of the demodulated signal which can be used to assess the error in symbols, especially a phase error. For example, a demodulation accuracy of the demodulated symbols can be used as the parameter representing the error in the demodulated symbols which may be used for clock offset compensation. Preferably a phase error in the demodulated symbols compared to an optimal or perfect location of the symbols with respect to decision boundaries of constellation points is determined. Clock offset will generate a phase shift in the samples received by the sample extractor 26. Hence if the clock offset will generate a phase shift in the demodulated samples which can be detected in accordance the present invention. By examining the samples on either side of the current best sampling point, a more optimal sampling point can be determined.

Another example of a demodulation accuracy parameter is a value related to an error energy of demodulated symbols obtained from samples on either side of the current best sampling point. This energy can be determined and used as a criterion for adjusting the best sampling point. For example, the sample with the highest energy value of an error vector can be selected as this is indicates the maximum phase shift from optimum. Any suitable energy measurement can be used, for example for differential phase modulated samples, the Differential Error Vector Magnitude (DEVM) can be used. For absolute phase modulation Error Vector Magnitude (EVM) can be used. EVM or DEVM is a measure of the difference between a waveform, e.g. an ideal waveform and a measured waveform. The difference is called the error vector for an M-ary I/Q modulation scheme.

A correlator 40 (see FIG. 3) receives the samples from the direct stream 30 and optionally the streams from the interpolating filters 32, 34, 36 and selects one sample as the sampling point from one of these streams. Typically this will be done during receipt of a known sequence. The correlator can operate by autocorrelation, by cross-correlation with a known sequence or a combination of both. For example correlator 40 receives 4 streams and feeds back to a multiplexer 42 and to a sampling and demodulator block 44 the following information:

i) The best sampling point
ii) Which stream is to be selected.

Figure 5:
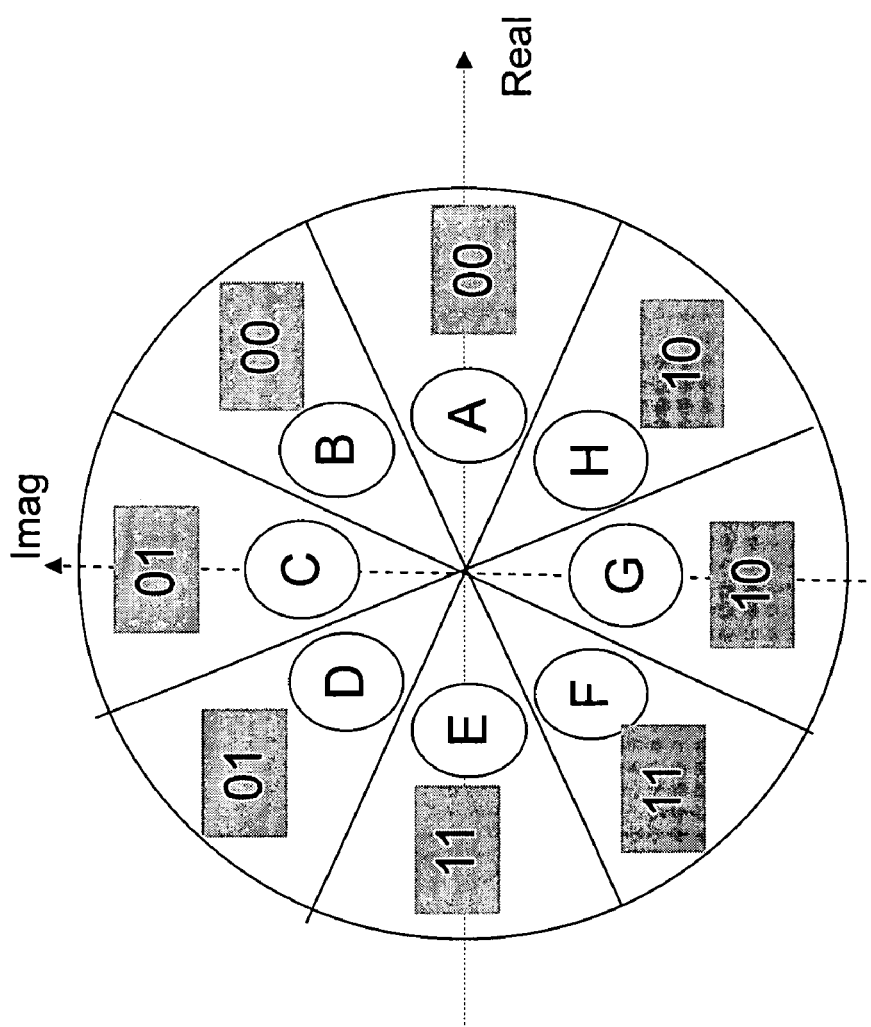
FIG. 5 shows demodulated symbols on a diagram with axes being the values of the real and imaginary parts of the signals representing the symbols for an 8-ary system.

The multiplexer 42 selects the relevant signals from the stream 30 or those from the filters 32, 34, 36 and feeds these signals to the demodulator block 44. The demodulator block 44 demodulates the symbols using each sampling time provided by the correlator 40. Especially for later times, e.g. after the known sequences, the present invention examines errors in the demodulated symbols and errors in symbols demodulated from samples on either side of the current best sampling point in order to detect when the sampling point must be changed due to clock offset. The decision areas for the 8-DPSK demodulated signal are shown in FIG. 5. If a selected sample lands in one of these areas then this is given the corresponding symbol value. In this case there are 8 binary symbols and 8 decision areas with decision boundaries, i.e. it is an 8-ary system, but the present invention is not limited to 8-ary systems but is applicable to any M-ary system when M is 2 or greater. With reference to FIG. 6a if one region of the decision area is considered, e.g. region A corresponding to the binary triplet 000, then the demodulated symbols based on samples on either side of the best sampling point in the sample stream will be located at different points or positions within the region (FIG. 6b) compared to the demodulated symbol based on the current best sampling pint. These different points will be associated with different demodulation accuracies, e.g. different phase errors or different demodulation error energies in comparison with either an ideally located symbol (i.e. in the centre of the region) or the symbol obtained from the current best sampling point. In fact as the clock drifts the points will migrate towards the boundaries of the region and eventually over it at which point bit errors will occur.

Figure 7:
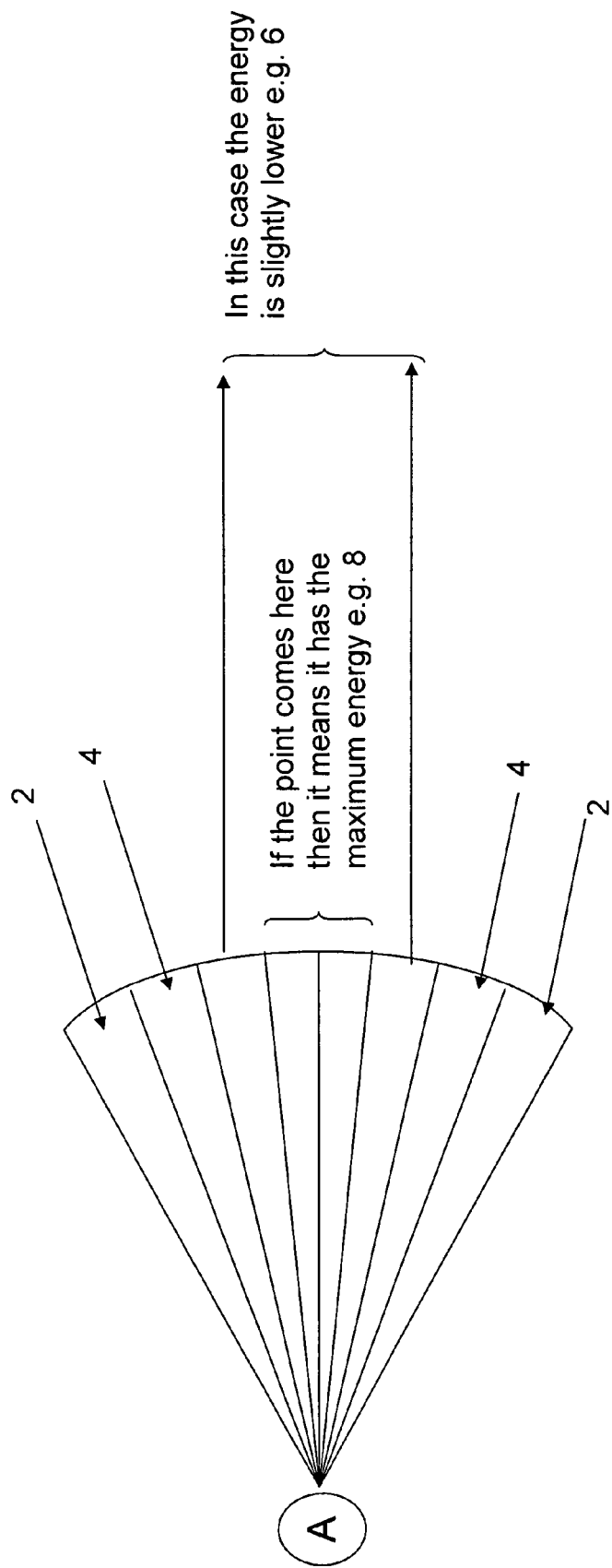
FIG. 7 shows how energies are assigned to symbol points depending on how close they are to the boundaries of a decision area in accordance with an embodiment of the present invention.

In accordance with this embodiment as shown in FIG. 7, each region can be divided into a plurality of segments, e.g. 8 segments. Demodulated symbols being located at points towards the middle of the region A, i.e. the fourth or fifth areas may be assigned a high arbitrary value, i.e. a good demodulation accuracy, e.g. an arbitrary value of 8. Points landing in the third and sixth areas can be assigned a lower value such as 6. Points landing in the second and seventh areas can be assigned the value 4 and points landing in the first and eight areas are given the lowest value of 2. These values may be assigned simply on the position in the decision area or more complex calculations may be done, e.g. energy calculations to obtain a value related to demodulation accuracy.

Figure 8:
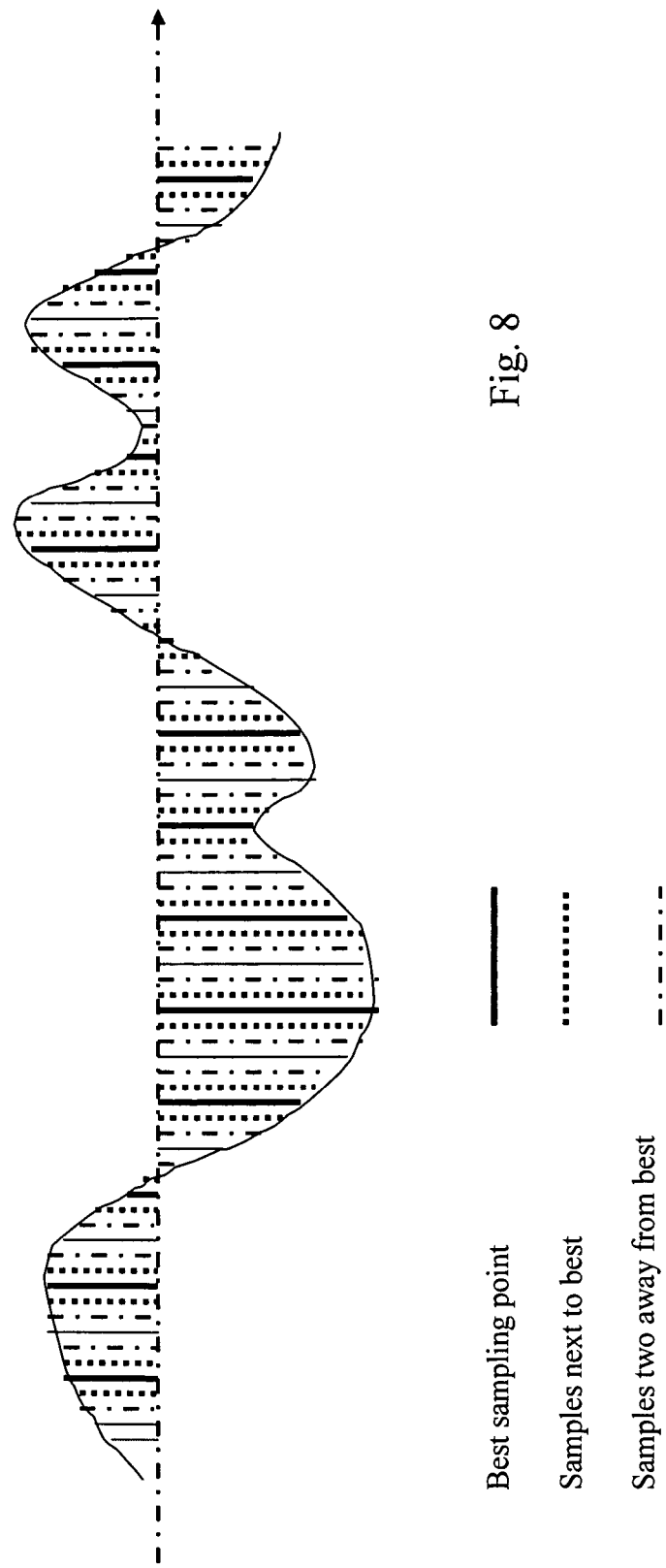
FIG. 8 shows the current best sampling points (solid thick line) and samples on either side thereof (one removed as dotted line and tow removed as dot/dash line) which are all demodulated in accordance with an embodiment of the present invention in order to obtain the demodulation accuracy for symbols on either side of the symbol demodulated based on the current best sampling point.

To assess the accuracy i.e. a good demodulation accuracy, e.g. phase error or error vector energy values, the present embodiment includes demodulating a plurality of symbols having different sampling points for each final symbol selected. The points demodulated include the symbol obtained with the current best sampling point. Not only the sample selected by correlator 40 but also adjacent samples are demodulated. There is time within the 1 microsecond symbol period to do this so that the demodulation algorithm can be run in real time. To calculate the demodulation accuracy, e.g. phase errors or error energies, a calculation block 46 receives a plurality of symbols, e.g. 4 or 5 symbols from the demodulator block 44. These comprise the symbol demodulated based on the best sampling time as assessed by the correlator 40 plus a number of symbols determined by selecting samples from the sample stream at sampling times on either side of the current best sampling time—see FIG. 8. The multiplexer 42 provides the required samples to the demodulator 44 as determined by control signals from the correlator 40 and/or the calculation block 46.

To explain the determination of a phase error from the demodulated samples further the output from the vector product block is two signals and may be summarized as:

$$V\cos(K) = I_K \cdot I_{K-1} + Q_K \cdot Q_{K-1}$$

$$V\sin(K) = -I_K \cdot Q_{K-1} + Q_K \cdot I_{K-1},$$

where I and Q are the in-phase and in-quadrature signals received by the vector block and K is the number of the relevant sample. The notation is basically the same as used in U.S. Pat. No. 6,703,896 but applied to an M-state phase modulation with greater than 2. This can be written as:

$$V\cos(k) = A_K A_{K-1} \cos\Phi_K \cos\Phi_{K-1} + A_K A_{K-1} \sin\Phi_K \sin\Phi_{K-1} =$$
$$A_K A_{K-1} \cos(\Phi_K - \Phi_{K-1}) =$$
$$A_K A_{K-1} \cos(\Delta\Phi_K)$$
$$V\sin(k) = -A_K A_{K-1} \cos\Phi_K \sin\Phi_{K-1} + A_K A_{K-1} \cos\Phi_{K-1} \sin\Phi_K =$$
$$A_K A_{K-1} \sin(\Phi_K - \Phi_{K-1}) = A_K A_{K-1} \sin(\Delta\Phi_K)$$

where $\Delta\Phi_k$ is the difference in phase value which is related to the symbol to be determined. This phase difference is not obtained directly but only as the sine and cosine projections. Its values for optimal symbols are $\pm\pi/4$ and $\pm 3\pi/4$ for $\pi/4$ DQPSK. For 8-DPSK they are 0, $\pm\pi/4\pm\pi/2$, $\pm 3\pi/4$ and $\pi$. The symbols are identified in the demodulator by the position within the constellation diagram, i.e. within decision areas as shown in FIG. 5 for 8-DPSK. By examining Vcos(k) and Vsin(k) for the sample at the current best sampling time and from samples on either side of this sample, the positions of the symbols (see FIG. 6b) in the constellation diagram with reference to the decision boundaries and with reference to the symbol demodulated with the current best sampling point can be obtained. From these positions a demodulation accuracy for each demodulated symbol can be determined and used to correct for clock shift. The receiver according to the present invention may be implemented as a program running on a personal computer. The above receiver can be implemented as an integrated circuit or by other means, e.g. on a Printed Circuit Board. The receiver according to the present invention may be implemented on an Integrated Circuit comprising an embedded processor. The processor may be a microprocessor or a programmable gate array such as a Field Programmable Gate array or any other suitable processing means.

In particular software according to the present invention may include code segments which when implemented on a processing engine execute means for selecting a first sampling point and at least a second sampling point from at least a first stream of first digitized samples derived from a received analog signal at a first sampling rate, a demodulator for demodulating first and second symbols from the at least first stream of samples based on the first and the at least second sampling points, and means for determining a value related to a demodulation accuracy for the first and second symbols and for outputting a signal, the means for selecting being adapted to alter the sampling point based on the signal. The demodulation accuracy can be a value related to a phase error or to a demodulation error energy such as EVM or DEVM for each demodulated symbol. The code may also implement at least one interpolating filter in parallel with a first stream of first digitized samples at a first sampling rate for generating at least a second stream of digitized samples at the first sampling rate but offset with respect to the first stream derived from an analog signal at the first sampling rate by a fraction of a sample time period. The code may provide the at least one interpolating filter as a FIR filter. The code may also provide a sample extraction block and also the feeding of the first and the at least one second streams to the sample extraction block. The code may also be adapted to select a sample from either the first or the at least one second streams as a symbol. The code may also be adapted such that the deriving of the first stream of first digitized samples from a received analog signal at the first sampling rate comprises generating a third stream of digitized samples from the received analog signal at a second sampling rate and interpolating the third stream to generate the stream of first digitized samples which are estimates of samples obtainable by sampling the received analog signal at the first sample rate lower than the second sampling rate, the first digitized samples being output at the first sampling rate and including at least one unusable sample. The code may also implement a circuit for generating a signal for controlling other components than the further interpolation filter to prevent processing of the unusable second digitized samples. The code may also implement an SRRC filter for receiving the second digitized samples, the SRRC filter being configured to process samples at the first sample rate.

The software may include code for downconverting a received wireless signal into a lower frequency analog signal, the downconverting step being followed by a digitization step on said lower frequency analog signal such as to obtain the in-phase component and the orthogonal phase component of the digital baseband signal.

Alternatively, digitization can include an analog/digital conversion followed by a digital downconversion such as to obtain said in-phase component and said orthogonal phase component.

The software may include code for generating a vector product.

The software may be supplied stored on a suitable machine readable signal medium such as an optical disk, e.g. CD-ROM or DVD-ROM, or disk or diskette, solid state memory, etc.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A receive path in a receiver comprising:
   means for deriving at least a first stream of first digitized samples from a received analog signal at a first sampling rate,
   at least one interpolating filter in parallel with the first stream of first digitized samples for generating at least a second stream of second digitized samples from the first stream of first digitized samples at the first sampling rate but offset with respect to the first stream by a fraction of a sample time period,
   means for selecting a first sampling point associated with the first stream of first digitized samples and at least a second sampling point associated with the at least second stream of second digitized samples, and
   for providing a selected first or at least second stream of the first and at least second streams of digitized samples and a respective sampling point to a demodulator,
   the demodulator for demodulating at least first and second symbols from the selected first or at least second stream of digitized samples based on the respective sampling point, and
   means for determining a value indicative of how accurately the demodulator demodulated the first and second symbols and for outputting a signal, and wherein the means for selecting is adapted to alter at least one of the first and the at least a second sampling points based on the signal.

2. The receive path according to claim 1, wherein the demodulation accuracy is a demodulation error in relation to an optimum demodulation of a symbol.

3. The receive path according to claim 2, wherein the error is a phase error.

4. The receive path according to claim 1, wherein the demodulation accuracy is an error energy.

5. The receive path according to claim 4 wherein the demodulation accuracy is an error value related to Error Vector Magnitude (EVM) or Differential Error Vector Magnitude (devm) for each demodulated symbol.

6. The receive path according to claim 1, wherein the at least one interpolating filter is a FIR filter.

7. The receive path according to claim 1, wherein the first and the at least one second digitized streams are fed to the means for selecting the first sampling point and at least the second sampling point, and
   the demodulator is adapted to demodulate first and second symbols from the first digitized stream and from the at least one second digitized stream of samples based on the respective first and the at least second sampling points.

8. The receive path according to claim 7, wherein the means for selecting includes a multiplexer to select samples from the first or at least one second digitized streams and to feed these to the demodulator.

9. The receive path according to claim 1, wherein the means for selecting a first sampling point and at least a second sampling point includes a correlator.

10. The receive path according to claim 1, wherein the demodulator is an M-ary demodulator.

11. The receive path according to claim 1, wherein the means for deriving a first stream of first digitized samples from a received analog signal at a first sampling rate comprises:
   means for generating a third stream of digitized samples from the received analog signal at a second sampling rate and a further interpolating filter receiving the third stream from the means for generating the third stream, to generate the stream of first digitized samples which are estimates of samples obtainable by sampling the received analog signal at the first sample rate lower than the second sampling rate, the first digitized samples being output at the first sampling rate and including at least one unusable sample.

12. The receive path according to claim 11, further comprising:
   a circuit for generating a signal for controlling components of the receive path downstream of the further interpolation filter to prevent processing of the unusable second digitized samples.

13. The receive path according to claim 1, further comprising a Square Root Raised Cosine (SRRC) filter for receiving the first digitized samples, the SRRC filter being configured to process samples at the first sampling rate.

14. The receive path according to claim 12, wherein the circuit for generating a signal is a counter.

15. The receive path according to claim 1, wherein the receiver is a Bluetooth receiver.

16. A method of operating a receiver comprising:
   deriving at least a first stream of first digitized samples from a received analog signal at a first sampling rate,
   generating in parallel with the first stream of first digitized samples in at least one interpolating filter at least a second stream of second digitized samples from the first stream at the first sampling rate but offset with respect to the first stream by a fraction of a sample time period,
   selecting a first sampling point associated with the first stream of first digitized samples and at least a second sampling point associated with the at least second stream of second digitized samples,
   providing a selected first and at least second stream of digitized samples and respective sampling points to a demodulator,
   demodulating at least first and second symbols from the selected at least a first and at least second stream of digitized samples based on the first and the at least a second respective sampling points,
   determining a value indicative of how accurately the first and second symbols were demodulated, and
   altering at least one of the first and the at least a second sampling points based on the result of the determination value.

17. The method according to claim 16, wherein the value related to the demodulation accuracy is a demodulation error in relation to an optimum demodulation of a symbol.

18. The method of claim 17, wherein the error is a phase error.

19. The method of claim 16, wherein the demodulation accuracy is an error value related to Error Vector Magnitude (EVM) or Differential Error Vector Magnitude (DEVM) for each demodulated symbol.

20. A receive path in a receiver comprising:
   an analog-to-digital converter configured to derive at least a first stream of first digitized samples from a received analog signal at a first sampling rate;
   at least one interpolating filter in parallel with the first stream of first digitized samples configured to generate at least a second stream of second digitized samples from the first stream at the first sampling rate but offset with respect to the first stream by a fraction of a sample time period, a correlator configured to identify a sampling point associated with the first stream or at least second stream of digitized samples and identify the first stream or at least second stream and the identified sampling point to be provided to a demodulator;

a multiplexor configured to operate in combination with the correlator to provide a selected first or at least second stream of the first and at least second streams of digitized samples, the demodulator configured to demodulate at least first and second symbols from the selected first or at least second stream of digitized samples based on the selected sampling point; and a calculation component configured to determine a value indicative of how accurately the demodulator demodulated the first and second symbols and to output a signal, and wherein the correlator is adapted to alter at least one of the first and the at least a second sampling points based on the signal.

21. A Bluetooth receiver comprising the receive path of claim 20.

22. The receive path according to claim 20, wherein the demodulator is an M-ary demodulator.

23. The receive path according to claim 20, wherein the value indicative of how accurately the demodulator demodulated the first and second symbols comprises an error value related to Error Vector Magnitude (EVM) or Differential Error Vector Magnitude (DEVM) for each demodulated symbol.

24. The receive path according to claim 20, wherein the value indicative of how accurately the demodulator demodulated the first and second symbols comprises a phase error.

* * * * *